S. RICHARDS.

Car-Track Clearer.

No. 2,671.

Reissued July 9, 1867.

Witnesses:

J. E. Shreve.
Geo. E. Buckley.

Inventor:

Samuel Richards.

AM. PHOTO-LITHO. CO. N.Y. (OSBORNE'S PROCESS.)

United States Patent Office.

SAMUEL RICHARDS, OF PHILADELPHIA, PENNSYLVANIA.

*Letters Patent No.* 19,950, *dated April* 13, 1858; *reissue No.* 2,671, *dated July* 9, 1867.

IMPROVED SNOW-PLOUGH.

The Schedule referred to in these Letters Patent and making part of the same.

TO ALL WHOM IT MAY CONCERN:

Be it known that I, SAMUEL RICHARDS, of the city of Philadelphia, State of Pennsylvania, have invented a new and useful improvement in Snow-Ploughs; and I do hereby declare the following to be a full and exact description of the same, reference being had to the annexed drawings, making part of this specification, in which—

My invention consists in an improvement on a snow-plough, for which Letters Patent were granted to me May 13, 1856, and has for its object the location and adjustment of the lateral wedge-piece, (described in that patent,) so that the snow on the track, after being raised up to the level of the surrounding snow, can be all pressed or thrown over laterally on to either side. This capacity of discharging the snow on either side is of importance where there is cutting or embankment near one side of the track, and none on the other side, or where there is a double track or at sidelings. In such cases it would be manifestly important to discharge all the snow on to one side, instead of equally on both sides of the track. As the locomotive and train pass along it is obvious that the relative position of embankments or other obstructions to the lateral discharge of the snow will frequently change from one to the other side of the track, and hence it is important also that the position of the vertical discharging snow-wedge should be susceptible of being conveniently changed.

Figure 1:
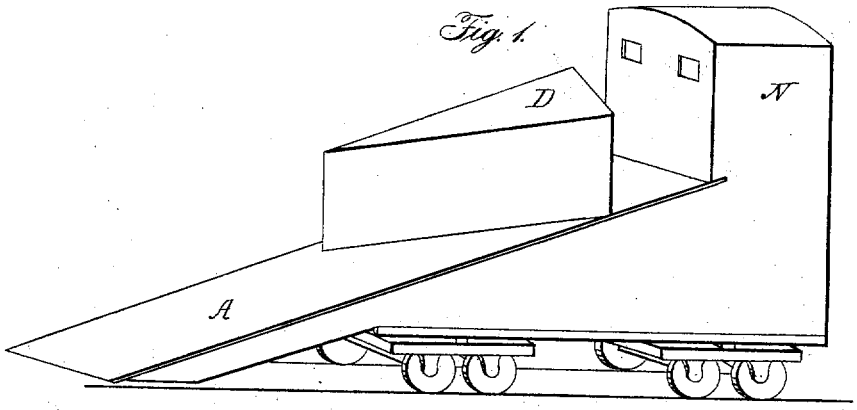
Figure 1 is a perspective view of my improved plough, arranged for discharging the snow all on one side.
Figure 2:
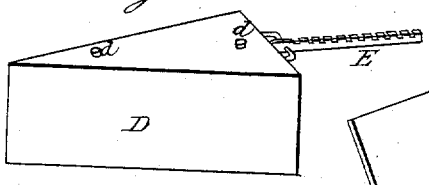
Figure 2 is a view of the lateral wedge.
Figure 4:
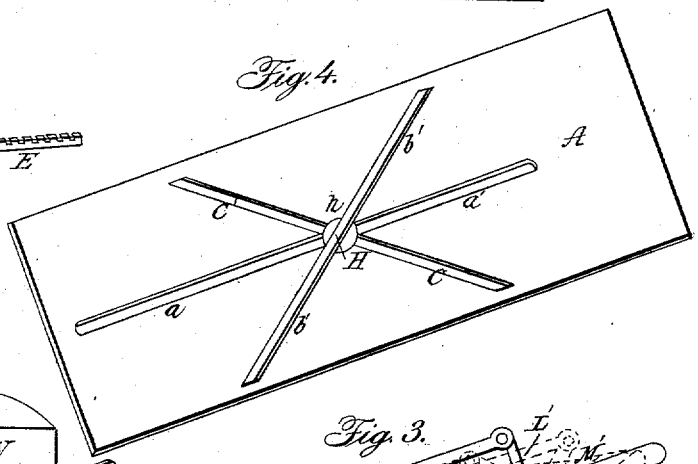
Figure 4 is a view of the inclined plane with the lateral wedge removed.
Figure 5:
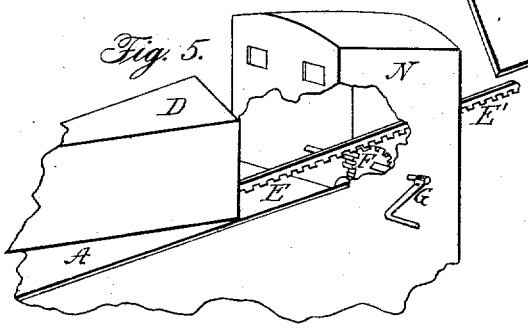
Figure 5 is a perspective view of my improved plough, certain parts being broken away, to show the internal arrangement.
Figure 3:
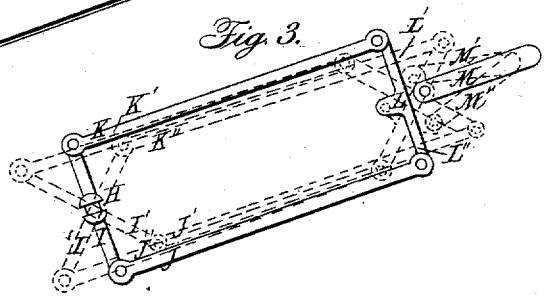
Figure 3 is a view of the internal frame for operating a guide-piece herein described.

The long inclined plane A is supported as a framework, supported by two swivelling trucks, as described in my former patent. My vertical planes are constructed in a single block or piece of a triangular prismatical form, as shown at fig. 2, having on its under side two projections, *d d*, or lugs to fit into the grooves in the plane A, fig. 4, and having also attached to its upper part a rack, E E, attached by means of a universal joint. When it is intended to use this plough on a double-track road, the block D may be permanently fixed to one side, as shown in fig. 1, or the block may be so made as to slide up and down on the main plane, the projections *d d* being in the grooves of the main plane, as shown at fig. 4. The block D, fig. 5, is slid up and down by means of the rack E E′, and a pinion, F, so placed as to be under the control of a workman or an assistant. The block D, in sliding up and down, is made to have its point pass to one side or the other of the main inclined plane A, by means of a little turning-guide, H, which has one groove, *h*, made diametrically across it. This little turning-guide is supported below upon a pivot, so that it can freely turn, and thus assume any one of the three positions shown by the dotted lines on the drawing. When turned into one position this guide forms a continuous groove from *a*, fig. 4, along *h* and down *a′*, and then if the block D were slid down, its point would pass right down the centre of the main inclined plane to the lower extremity of *a′*, and the snow could be discharged equally on both sides of the plough. When the piece H is turned into a second position it will form a continuous groove from *a* down *h*, and along *b′*, and would cause the point of the block D, when slid down, to assume a position on *b′*, and thus throw the snow all over to the opposite side of the plough. When the piece H is turned into a third position, it causes the point of the block D to assume the position upon C′, and thus throw all the snow over to the opposite of the plough from C′. The revolving guide-piece H is made to turn into either of the three positions above named, by means of a concealed framework, such as shown in fig. 3. It consists of a piece, I, attached to the centre-guide, H. This piece I is also attached at its extremities to the pieces J and K, by pivots or rivets, and at the upper extremity J and K, by the cross-piece L. The arrangement of this parallelogram so composed, is such that by moving the handle M into the position M′, the pieces can be made to assume the relative position I′ J′ K′ L′, or by moving it into position M″, the frame can be made to assume the position I″ J″ K″ L″. This frame I J K L is attached to the under side of the main plane A, and the handle M is placed on the inside of the assistant's or workman's covering or protection N.

The operation of the improvement is as follows: The block D is elevated to the top of the main plane.

The assistant or operator occupies a position in the housing N, within convenient reach of the crank or handle G, and also of the handle M. If the engineer perceives that the snow can be freely discharged on both sides of the plough, he takes the handle M and adjusts the guide H so as to occupy the position coinciding with the direction of *a* and *a'*. He then, by means of the crank G, turns the pinion, and pushes the block D down to the main plane. If he wishes for any reason to discharge the snow all on one side, by means of the crank he raises the block D, and then adjusts, by means of the handle M, the guide H, so as to cause the point of D to pass to the right or left at his pleasure, when it is slid down as above described. When it is desired to use my plough permanently on a double-track road, then the wedge-piece D may be permanently located on one side of the inclined plane, as shown at fig. 2; but when it is desired to use it on a single as well as a double track, then the piece D should be made movable from side to side, and operated as above.

Having thus described my invention, what I claim as new, and desire to secure by Letters Patent, is—

1. The long inclined plane for raising the snow gradually, mounted upon two swivelling trucks, with the lateral acting wedge elevated above the level of the surrounding snow, and located on one side of the inclined plane in the position shown in fig. 1, for discharging the snow on double-track roads.

2. The inclined plane for raising the snow arranged so as to be adjustable up and down the plane and from side to side, substantially as described.

SAMUEL RICHARDS.

Witnesses:

J. E. SHAW,

GEO. E. BUCKLEY.